(12) United States Patent
Bulmus et al.

(10) Patent No.: US 11,960,608 B2
(45) Date of Patent: Apr. 16, 2024

(54) FAST SECURE BOOTING METHOD AND SYSTEM

(71) Applicant: Infineon Technologies AG, Neubiberg (DE)

(72) Inventors: Atilla Bulmus, Canton, MI (US); Jeffrey Todd Kelley, Plymouth, MI (US); Chris Wunderlich, Canton, MI (US)

(73) Assignee: Infineon Technologies AG, Neubiberg (DE)

( * ) Notice: Subject to any disclaimer, the term of this patent is extended or adjusted under 35 U.S.C. 154(b) by 153 days.

(21) Appl. No.: 17/243,834

(22) Filed: Apr. 29, 2021

(65) Prior Publication Data

US 2022/0350891 A1 Nov. 3, 2022

(51) Int. Cl.
*H04L 29/06* (2006.01)
*G06F 21/57* (2013.01)
*H04L 9/32* (2006.01)

(52) U.S. Cl.
CPC .......... *G06F 21/575* (2013.01); *H04L 9/3236* (2013.01); *G06F 2221/034* (2013.01)

(58) Field of Classification Search
CPC .. G06F 21/575; G06F 2221/034; G06F 21/64; H04L 9/3236
See application file for complete search history.

(56) References Cited

U.S. PATENT DOCUMENTS

| | | | |
|---|---|---|---|
| 2005/0138270 A1* | 6/2005 | Morais | G06F 21/575 |
| | | | 711/102 |
| 2006/0053246 A1* | 3/2006 | Lee | G06F 9/4403 |
| | | | 711/100 |
| 2006/0062046 A1* | 3/2006 | Babudri | G06F 11/1417 |
| | | | 714/E11.133 |
| 2009/0024899 A1* | 1/2009 | Reid | G06F 11/1068 |
| | | | 714/E11.002 |
| 2009/0044077 A1* | 2/2009 | Choi | G11B 20/00086 |
| | | | 714/764 |
| 2009/0144559 A1* | 6/2009 | Lee | G06F 21/575 |
| | | | 713/189 |
| 2010/0251074 A1* | 9/2010 | Chu | G06F 11/1068 |
| | | | 714/E11.032 |
| 2012/0005557 A1 | 1/2012 | Mardiks | |
| 2012/0102260 A1* | 4/2012 | Kawamura | G06F 3/0688 |
| | | | 711/E12.008 |

(Continued)

*Primary Examiner* — Taghi T Arani
*Assistant Examiner* — Lin Chang
(74) *Attorney, Agent, or Firm* — Eschweiler & Potashnik, LLC

(57) ABSTRACT

A method to secure boot an electronic device is disclosed according to some embodiments. The method includes receiving a request to initiate a boot sequence using memory content stored in a non-volatile memory circuit. A secure boot circuit receives verification data from the non-volatile memory circuit indicating the memory content. The verification data includes an error correction code for the memory content without including all of the memory content. A cryptographic hashing operation is performed to the error correction code in the secure boot circuit to obtain a digest of the error correction code. The digest is compared with a pre-stored reference digest to generate a verification signal. The verification signal is provided to the electronic device indicating whether the boot sequence passes the verification.

20 Claims, 5 Drawing Sheets

(56) References Cited

U.S. PATENT DOCUMENTS

| | | | | |
|---|---|---|---|---|
| 2014/0143601 A1* | 5/2014 | Chen | ............. | G06F 11/2284 |
| | | | | 714/36 |
| 2015/0280749 A1* | 10/2015 | Gjorup | ............. | G06F 11/1072 |
| | | | | 714/752 |
| 2016/0246672 A1* | 8/2016 | Yang | ............. | G06F 3/064 |
| 2016/0335154 A1* | 11/2016 | Zhong | ............. | G06F 11/1008 |
| 2018/0349608 A1* | 12/2018 | de Cesare | ............. | G06F 21/575 |
| 2019/0171821 A1* | 6/2019 | Asano | ............. | G06F 21/85 |
| 2019/0332468 A1* | 10/2019 | Chaiken | ............. | G06F 3/0679 |
| 2019/0370114 A1* | 12/2019 | Troia | ............. | G06F 11/10 |
| 2020/0104504 A1* | 4/2020 | Chaiken | ............. | G06F 21/575 |
| 2020/0334360 A1* | 10/2020 | Inaba | ............. | G06F 21/572 |
| 2021/0064733 A1* | 3/2021 | Stolbikov | ............. | G06F 21/64 |
| 2021/0135854 A1* | 5/2021 | Karame | ............. | G06Q 20/3678 |
| 2022/0069992 A1* | 3/2022 | Ayyapureddi | ............. | G06F 11/1068 |
| 2023/0004649 A1* | 1/2023 | Su | ............. | G06F 11/1469 |

* cited by examiner

FAST SECURE BOOTING METHOD AND SYSTEM

FIELD

The present disclosure relates to fast secure booting methods, circuits and systems configured to authenticate memory contents prior to a devices use and realize a fast securely booted system.

BACKGROUND

Data security has become increasingly important in various industries. Data is often stored in a medium or memories, and it is desired to ensure data integrity from unwanted alteration prior to use of its contents or the underlying executable program. For example, in the automotive industry, Electronic Control Units request data from a memory, confirm the data is authentic before allowing it to operate in a central processor or controller in a safe, secure, trusted manner.

BRIEF DESCRIPTION OF THE DRAWINGS

The accompanying drawings are part of the present disclosure in order to allow further understanding of the present disclosure. The drawings depict embodiments of the present disclosure and are used together with the description to explain basic concepts of the disclosure. The claimed subject matter is described below with reference to the accompanying drawings. Views of the example embodiments serve merely to depict selected features of the respective example embodiment.

DETAILED DESCRIPTION

Figure 1:
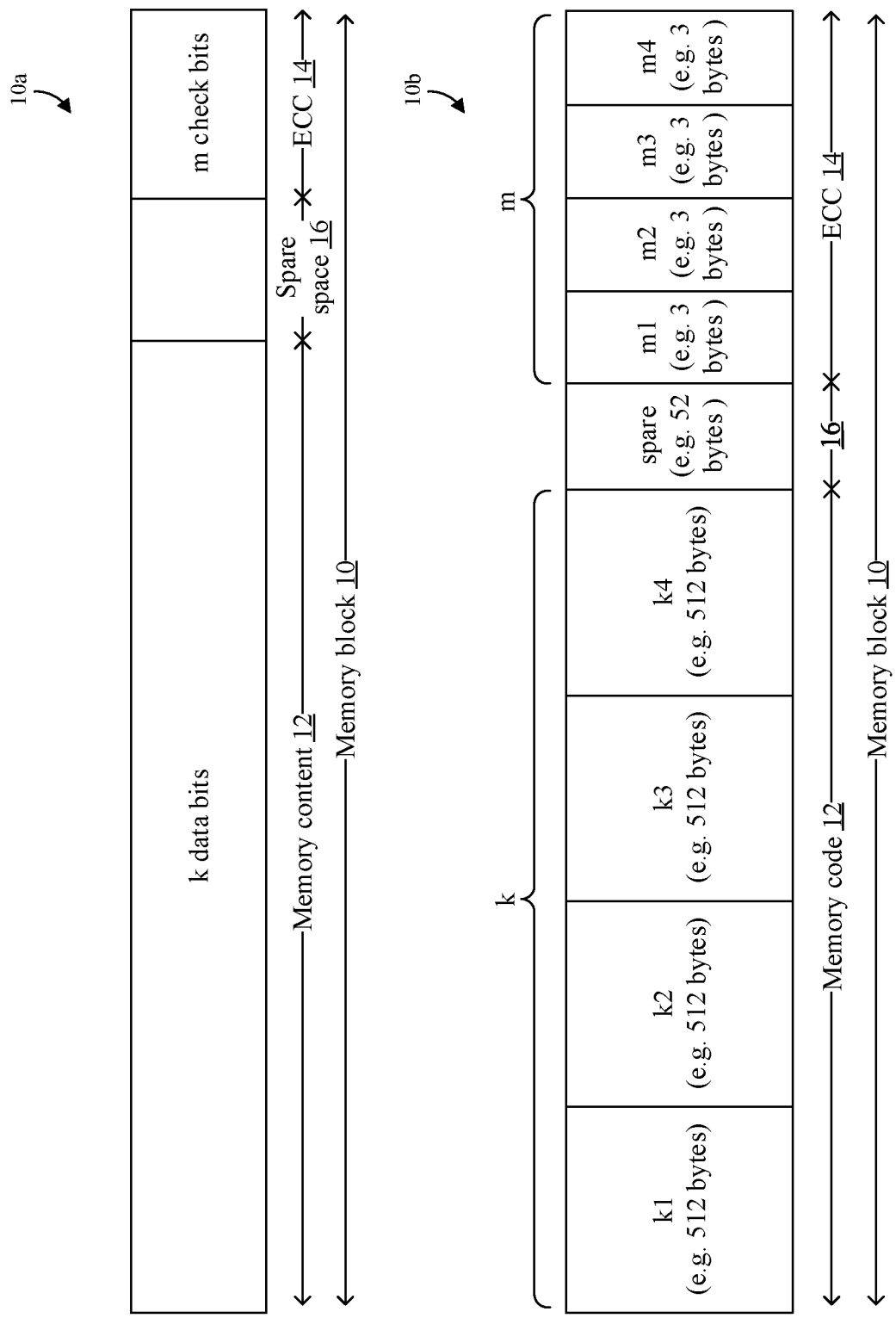
FIG. 1 illustrates schematic block diagrams of some embodiments of a memory block for an electronic device.

As utilized herein, terms "component," "system," "interface," "circuit", "module" and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the event that the terms "including", "includes", "having", "has", "with", or variants thereof are used in either the detailed description and the claims, such terms are intended to be inclusive in a manner similar to the term "comprising."

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of various aspects of various embodiments. However, it will be apparent to those skilled in the art having the benefit of the present disclosure that the various aspects of the various embodiments may be practiced in other examples that depart from these specific details. The various embodiments are not necessarily mutually exclusive, since some embodiments can be combined with other embodiments in order to produce further embodiments. Various embodiments are described herein in conjunction with apparatuses; various embodiments are described herein in conjunction with methods. It should be understood in this case that embodiments described in conjunction with methods may similarly also be implemented as an apparatus, and vice versa.

In an electronic device such as automotive or mobile applications, a secure and speedy system boot is desired. Secure boot involves a process to verify that contents in a system's memory are unaltered and ready for normal use before executing memory content. One way to perform this verification process is to run a cryptographic hash of the system's memory contents and then to compare the hashed data with a securely stored reference data. However, coverage of large memories in embedded systems becomes a greater challenge when a shorter boot time is required to realize speedy start operations. For example, current vehicles generally need about 10 to 20 seconds boot time for these cryptographic hash operations to complete and to wake up radio and other in-vehicle-infotainment systems. An imperceptible wait time is desired from the time an automobile driver touches the door until the vehicle system is fully awake and ready to operate. As another example, a fast, secure and properly booted system is required to operate a video link for a car back up camera that immediately displays an image after the shift of the vehicle into reverse.

When digital data is stored in a non-volatile memory, an error correction code (ECC) block can be implemented to correct errors in the digital data. As an example, the ECC block can be a number of additional bits encoded following data bits from the original data, instruction, variable or message during a write/programming operation. When the original message is reconstructed, the ECC block can be decoded to check and correct certain numbers of the error bits. The ECC block can also be viewed or interpreted as a compressed representation of the underlying memory content.

In view of the foregoing, the present disclosures are related to a fast secure booting method. In the method, rather than checking through the whole lengthy memory contents prior to initial loading of the memory content, an error correction code of a non-volatile memory is verified as at least a component of a compressed version of the memory content. Thus, the memory content can be checked and monitored in far less time than looking at the uncompressed whole version of the memory content which resides in the complete memory footprint, and a boot sequence can be conducted up to one or two orders of magnitude faster. For example, a processing time for a 1 MB memory check can be completed in 1.5 to 0.15 milliseconds approaching an imperceptible boot time or a mere moment compared to a previous processing time of about 15 milliseconds. It will be appreciated that although some aspects of this disclosure are described below with regards to one or more examples where instructions of a boot sequence stored in non-volatile memory are verified, these aspects can also be applied to verification of other software, such as firmware or application code, and can be applied to other types of memory, such as volatile memory, read-only memory, registers, and/or other types of memory.

In some embodiments, a method to verify and to initiate a boot sequence for an electronic device is presented. In the method, an error correction code is acquired from a non-volatile memory circuit to a secure boot circuit. The error correction code is then cryptographically hashed in the secure boot circuit to obtain a digest of the error correction code. The digest is then compared with a pre-stored reference digest to confirm its accuracy. The comparison result is used to generate a verification signal indicating whether the boot sequence passes the verification test and should be initiated.

Circuits, modules, and systems associated with fast secure booting operation are also disclosed. In some embodiments, a secure booting circuit is presented to provide a verification signal for a non-volatile memory circuit. The secure booting circuit can be a component of microcontrollers, microprocessors, secure memories, or other security chips with large memory contents. The secure booting circuit includes a move engine configured to read an error correction code of a boot code or data of interest from the non-volatile memory circuit and a secure move block configured to read a reference digest of an expected error correction code from a secure memory. The secure booting circuit further includes an encryption module coupled to the move engine and configured to receive the error correction code from the move engine and encrypt the error correction code as a digest. The secure booting circuit further includes a verification module coupled to the encryption module and the secure move block and configured to verify the digest based on the reference digest and to provide the verification signal indicating whether the verification is passed and whether the boot sequence should be initiated.

In some further embodiments, a secure booting system is presented for verification of initiation of a boot sequence for an electronic device. The secure booting system includes a non-volatile memory circuit having a non-volatile memory and a memory controller. The non-volatile memory is configured to store memory content corresponding to the boot sequence. The memory controller is configured to calculate an error correction code based on the memory content stored in the non-volatile memory. A secure boot circuit is coupled to the non-volatile memory circuit via a first transfer bus. A secure memory is coupled to the secure boot circuit via a second transfer bus. The secure memory is configured to store an expected digest value corresponding to a reference error correction code. The secure boot circuit is configured to provide a verification signal without hashing the complete memory content stored in the non-volatile memory based on the expected value and the error correction code. The verification signal indicates whether the boot sequence passes the verification test. In some embodiments, the boot sequence is initiated in a normal mode if the verification signal is in a first state and the boot sequence is not initiated in the normal mode if the verification signal is in a second state.

FIG. 1 illustrates schematic block diagrams 10a, 10b of a memory block 10 used for an electronic device according to some embodiments. The memory block 10 may include some data bits of a memory content 12 either followed or preceded by some check bits of an error correction code (ECC) 14. As an example, FIG. 1 shows the memory content 12 followed by the error correction code 14 and separated therefrom by a spare space 16. The error correction code 14 can be encoded by various error correction algorithms, such as single-error-correcting (SEC) Hamming code, single-error-correcting-double-error-detecting (SEC-DED) modified Hamming, and SEC-DED Hsiao code. For example, the memory content 12 may have a block of k data bits that can be encoded by an error correction algorithm to generate a block of m check bits as the error correction code 14. The amount of check bits m is smaller than the amount of data bits k. As shown in the schematic block diagram 10a, the m check bits may be stored immediately after its corresponding k data bits or follow some spare bits only. As shown in the schematic block diagram 10b, the m check bits may also include multiple check blocks, such as m1, m2, m3, m4, stored in consecutive addresses corresponding to multiple data blocks, such as k1, k2, k3, k4. The data blocks may also be stored in consecutive addresses and separated from the check blocks by one or more spare spaces 16. As an example, the Hamming code requires 22 bits (~3 bytes) of error correction code per 512 bytes data, or 96 bits (12 bytes) of error correction code per 2 kB page. In an example of a FLASH memory, 256 bits of concatenated error correction code bits would represent more than an order of magnitude of the original boot code bits or other memory content bits. In some examples, the m check bits can correct a correction number of bit errors and/or detect a detection number of bit errors. The detection number of bit errors can be greater than the correction number of bit errors. By way of example, as a result of the use of the error correction code 14, at least one-bit error can be correctable and at least two bit errors can be detectable, at least two bit errors can be correctable and at least three or at least four bit errors can be detectable, etc.

Figure 2:
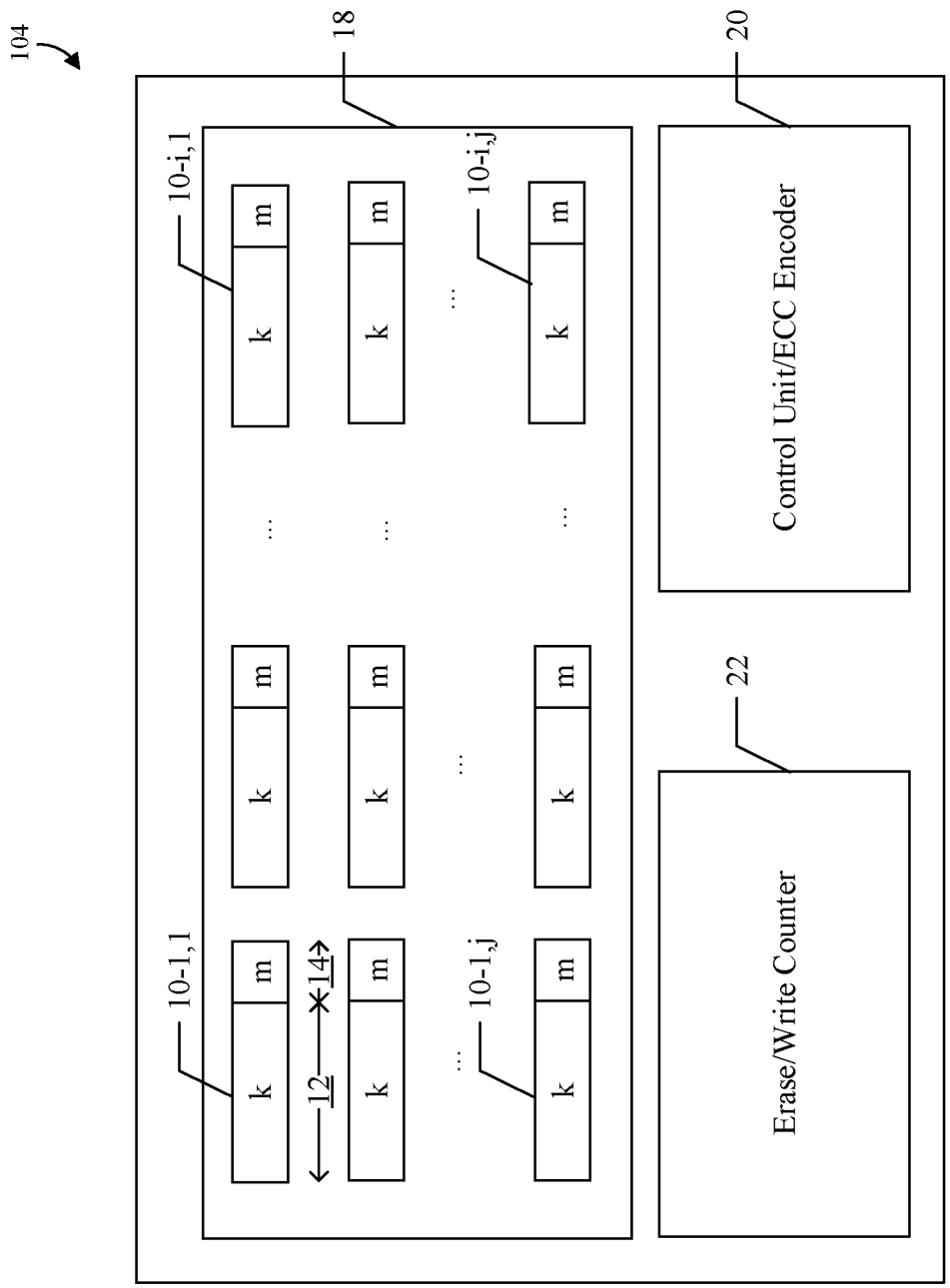
FIG. 2 illustrates a schematic block diagram of some embodiments of a non-volatile memory used for an electronic device.

FIG. 2 illustrates a schematic block diagram of a non-volatile memory circuit 104 used for an electronic device according to some embodiments. The non-volatile memory circuit 104 may include a non-volatile memory 18 and a memory controller 20. The non-volatile memory 18 can be a flash memory, a RRAM (resistive random access memory) or other kinds of applicable memories. In accordance with one exemplary embodiment, the non-volatile memory circuit 104 is configured for example as a program FLASH or an external memory.

The non-volatile memory 18 is configured to store memory content corresponding to a boot sequence and its error correction code. In some embodiments, the memory content can be boot code. In other embodiments, the memory content can be other data of interest that is associated with the boot sequence, such as images, voices, videos, measurements, etc., that will be used by the boot sequence. The memory content and the error correction code stored in the non-volatile memory 18 can be one or more bit sequences and/or data words. For example, each bit sequence can be stored at one or more addressable memory blocks 10 in the non-volatile memory 18. The address denotes, for example, a group of memory cells, and each memory cell is configured to store at least one bit of information. The address can refer to a group of memory cells which are correspondingly programmed for storing the bit sequence. Some embodiments of the memory blocks 10 are discussed above associated with FIG. 1.

The memory controller 20 is configured to calculate error correction code based on the memory content stored in the non-volatile memory 18. In some embodiments, the memory controller 20 is configured to read a bit sequence of the memory content from the non-volatile memory 18, calculate an expected error correction code based on the memory content using an error correction algorithm, hash the expected error correction code as a reference digest, and transmit the reference digest and/or the expected error correction code for secure storage. As time goes by, the expected memory content may suffer data degradation or attack and be converted to contain error bits. If a number or scale of the error bits is within the repairable range, the error correction code can be used to correct those error bits. If the number or scale of the error bits is out of the repairable range and/or the error correction code is also altered and becomes unusable, the memory content would suffer unrepairable damage. Running check of the error correction code may not be able to detect the damage when the error correction code is also unwantedly altered. When the error correction code becomes unusable, the memory controller 20 or other components of the non-volatile memory circuit 104 may detect and inform users that such event has occurred.

Periodically or in response to a request signal, the memory controller 20 is configured to read the memory content from the non-volatile memory 18, calculate error correction code based on the memory content using the error correction algorithm, and write the error correction code as a bit sequence in the non-volatile memory 18. The error correction code can be used to check and/or correct errors of the memory content. The error correction code is also stored and transmitted upon request for verification by a later secure boot operation. The error correction code can be stored in various addresses of the non-volatile memory 18 as discussed above associated with FIG. 1 and can also be stored in a separate area of the non-volatile memory 18 or in another data memory.

In some embodiments, the memory controller 20 is configured to generate and transmit the expected error correction code directly, immediately after the storage operation, or within a threshold duration of time after the storage operation of the expected memory content. By this method, the transmitted expected error correction code can accurately represent the expected memory content originally stored in the non-volatile memory 18. In some alternative embodiments, the expected error correction code can also be pre-generated prior to the storage operation of the expected memory content to the non-volatile memory 18. The pre-generated expected error correction code can be transmitted for security storage by the memory controller 20 or other controllers independently once the storage operation is performed. By this method, the quality of the expected error correction code is not affected by the storage operation.

In some embodiments, the memory controller 20 is configured to generate the error correction code for the memory content when permissible and/or implementable within the work sequence provided. For example, the error correction code may be generated during error checking or correcting operations implemented in the sequence of operations. The memory controller 20 can also be configured to generate and store the error correction code periodically after a relative longer time interval after storage or rewriting of the stored bit sequence. Thus, the stored error correction code can reflect errors of the memory content that have occurred during and after the storage of the expected memory content.

Figure 3:
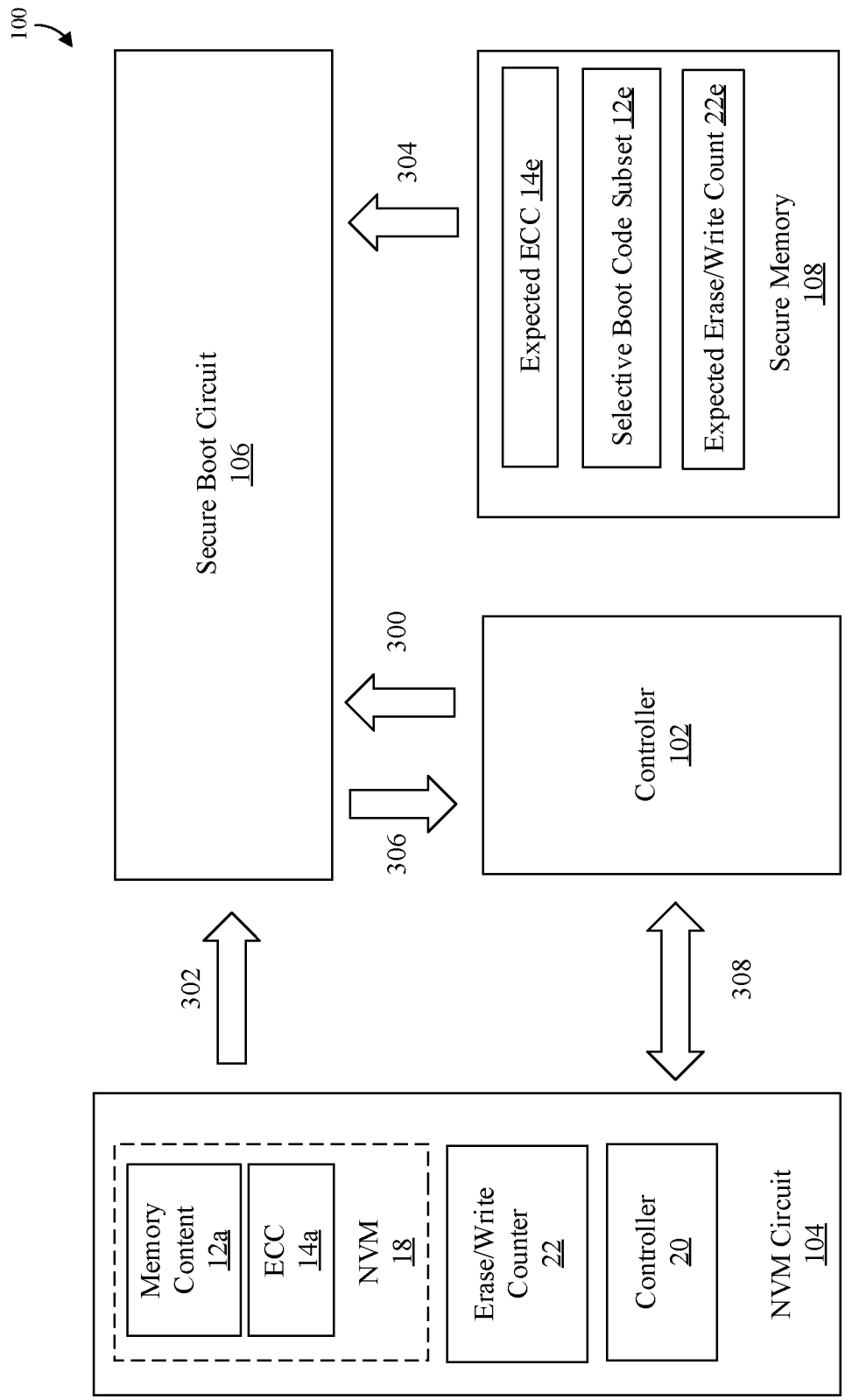
FIG. 3 illustrates a schematic block diagram of some embodiments of a secure booting system for verification of initiation of a boot sequence for an electronic device.

FIG. 3 illustrates a schematic block diagram of a secure booting system 100 to verify to initiate a boot sequence for an electronic device according to some embodiments. The secure booting system 100 includes an application controller 102, a non-volatile memory circuit 104, a secure boot circuit 106 coupled to the non-volatile memory circuit 104, and a secure memory 108 coupled to the secure boot circuit 106. Modules and components of the secure booting system 100 may be coupled from one another through various wire or wireless signal transfer buses such as conductor tracks, optical fibers, wirelessly or as another signal transmission medium.

In some embodiments, the application controller 102 is coupled to the secure boot circuit 106 and is configured to send a verification request 300 to the secure boot circuit 106 to perform a verification process of memory content saved in the non-volatile memory circuit 104 for initiating a boot sequence. The application controller 102 or a different controller may be further configured to receive a verification signal 306 indicating a verification result from the secure boot circuit 106 following the verification check process. The application controller 102 may further communicate (read/write) other memory data 308 with the non-volatile memory circuit 104.

In some embodiments, the non-volatile memory circuit 104 is configured to store and transmit memory content or a compressed representation of the memory content. The non-volatile memory circuit 104 transmit verification data 302 to the secure boot circuit 106 to perform the verification process. The verification data 302 does not include all of the memory content, but rather a representation or indication of the memory content with a data size smaller than that of the memory content. Time needed for the verification process is shortened as less data needs to be verified. Thus, the electronic device can be securely booted with a faster speed. In some embodiments, the verification data 302 is the error correction code only or includes at least the error correction code of at least a portion of the memory content.

The non-volatile memory circuit 104 may include a non-volatile memory 18 and a memory controller 20. The non-volatile memory 18 is configured to load the memory content associated with the boot sequence and the error correction code for the memory content. The error correction code may be calculated based on the memory content and additional address bits of the data location in the non-volatile memory 18. In some embodiments, the error correction code is pre-encoded and loaded to the non-volatile memory 18 together with the memory content. In some alternative embodiments, the memory controller 20 is configured to firstly read a bit sequence of an memory content 12*a* from the non-volatile memory 18, calculate an error correction code 14*a* based on the memory content 12*a* using an error correction algorithm during, immediately after, or within a threshold duration of time when the memory content 12*a* is loaded or rewritten in the non-volatile memory 18, and store the error correction code 14*a* in the non-volatile memory 18 or another memory of the non-volatile memory circuit 104. In some embodiments, the error correction code is also transmitted and stored in the secure memory 108 as or indicating an expected error correction code 14*e*. As time goes by, the memory content 12*a* in the non-volatile memory circuit 104 may suffer data degradation or attack and be converted to contain error bits. If a number or scale of the error bits is within the repairable range, the error correction code can be used to correct those error bits. If the number or scale of the error bits is out of the repairable range and/or the error correction code is also altered and becomes unusable, the memory content 12*a* would suffer undetectable and/or unrepairable damage. Periodically or implemented in a work sequence, the memory controller 20 is configured to read the memory content 12*a* from the non-volatile memory 18, calculate the error correction code 14*a* based on the memory content 12*a* using the error correction algorithm, and write the error correction code 14*a* as a bit sequence in the non-volatile memory 18. The non-volatile memory circuit 104 may be configured as the non-volatile memory circuit 104 described above associated with FIG. 2. The error correction code 14*a* can be stored in various addresses of the non-volatile memory 18 as discussed above associated with FIG. 1 and FIG. 2 and can also be stored in an area of the non-volatile memory 18 separated from the memory content 12*a* or some other data memories. The error correction code 14*a* is stored as representation or indication of the memory content 12*a* and transmitted as at least a component of the verification data 302 for verification upon request by a secure boot operation.

In some embodiments, the secure memory 108 is configured to store a reference data 304, such as a pre-stored expected hash value, representing or indicating the expected error correction code 14*e* and/or some other expected data for representation or indication of the expected memory content 12 from the non-volatile memory circuit 104. In some embodiments, the reference data 304 is stored in the secure memory 108. In some further embodiments, the reference data 304 is stored as an encrypted form to maintain confidentiality. The reference data 304 may be encrypted with a unique key per device such that the secure memory 108 can only be used with the device. In some embodiments, the reference data 304 includes expected error correction code 14*e*, selective memory content subset 12*e* and/or an expected erase/write count 22*e* for the non-volatile memory circuit 104.

In some embodiments, the secure boot circuit 106 is configured to perform a verification process upon request by receiving both the reference data 304 from the secure memory 108 and the verification data 302 from the non-volatile memory circuit 104, comparing the verification data 302 and the reference data 304, and providing the verification signal 306 based on the comparison result. If the comparison result indicates that the verification data 302 matches the reference data 304, the verification signal 306 would support initiation of the boot sequence for the electronic device. If the comparison result indicates that the verification data 302 does not match the reference data 304, the integrity of the non-volatile memory circuit 104 would be questioned. As an example, the boot sequence is initiated if the verification signal is in a first state. The boot sequence is not initiated if the verification signal is in a second state, and further procedures need to be performed. In the embodiments that the reference data 304 is stored in the secure memory 108 as an encrypted form, the encrypted reference data 304 may be transmitted to the secure boot circuit 106 and is decrypted in the secure boot circuit 106. In some embodiments, the secure boot circuit 106 is designed as a secure area that is configured with additional security protection. For example, the communication within the secure boot circuit 106 may be covered with side-channel protection features to be protected from a number of attacks. The secure boot circuit 106 can be an embedded hardware security module (HSM).

Figure 4:
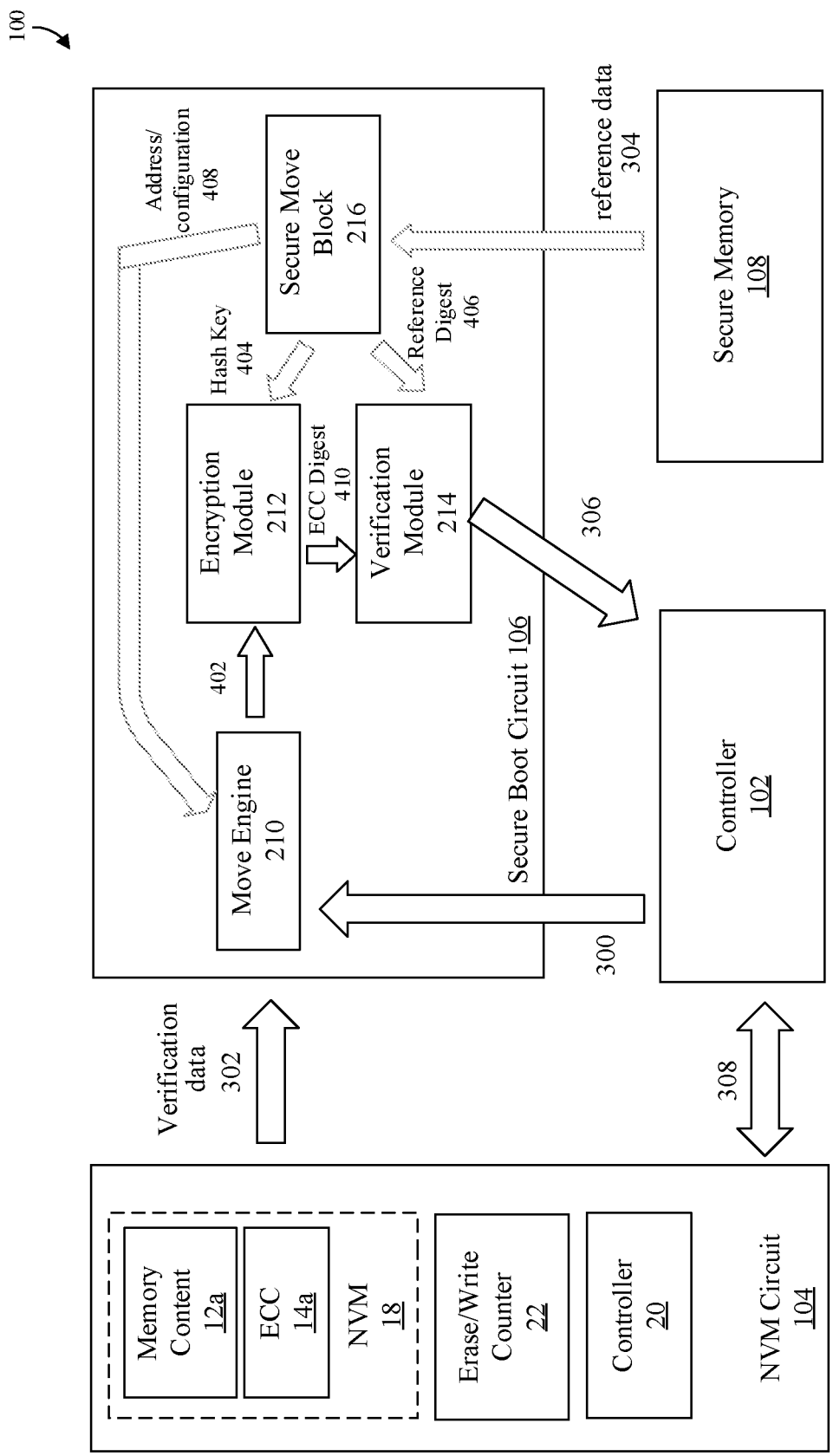
FIG. 4 illustrates a schematic block diagram of some embodiments of a secure booting system including a more detailed illustration of a secure boot circuit for verification of initiation of a boot sequence for an electronic device.

FIG. 4 illustrates a schematic block diagram of a secure booting system 100 including a more detailed illustration of a secure boot circuit 106 for verification of initiation of a boot sequence for an electronic device according to some embodiments. Though using a non-volatile memory circuit 104 as an example in other places of this specification, the boot sequence may be stored in one or more internal or external program memories or other transitory or non-transitory machine readable medium. The secure boot circuit 106 is configured to receive a verification request 300 (for example, from an application controller 102) to imitate a secure booting verification process. The secure boot circuit 106 is further configured to receive a verification data 302 (for example, from the non-volatile memory circuit 104) and a reference data 304 (for example, from a secure memory 108) responsive to the verification request 300. The secure boot circuit 106 is further configured to compare the verification data 302 and the reference data 304 and provide a verification signal 306 (for example, to the application controller 102) based on the comparison result. If the comparison result indicates that hashed data of the verification data 302 matches the reference data 304, the verification signal 306 would support initiation of the boot sequence for the electronic device. The verification data 302 does not include all of memory content, but rather a representation or indication of the memory content with a data size smaller than that of the memory content. Time needed for the verification process is shortened as less data needs to be verified. Thus, the electronic device can be securely booted with much greater speed.

In some embodiments, the secure boot circuit 106 is a hardware implementation. In some other embodiments, the secure boot circuit 106 can also be or be comprised of firmware or software implementations. By way of example, the secure boot circuit 106 can be an integrated circuit such as a FPGA (field-programmable gate array).

In some embodiments, the secure boot circuit 106 includes a move engine 210 coupled to the non-volatile memory circuit 104 and configured to read the verification data 302 from the non-volatile memory circuit 104 and produce a hashable data stream 402 for subsequent operation. The verification data 302 is determined based on verification data configurations. In some embodiments, the verification data 302 is or includes error correction code 14*a* generated based on the memory content 12*a*. The verification data 302 may also include data from the erase/write counter 22. The verification data 302 may include a selective subset of the memory content bits for more accurate verification, such as words, walking words within the page, or selective bits within the page from the memory content 12a. For example, the verification data 302 may be all the error correction code 14 for memory content 12a and every first bits of every bytes of the memory content 12a, or second bytes of every thirty-two bytes of the memory content 12a, etc. It is understood that the more data bits included in the verification data 302 for verification, the more accurate the verification result may be, however, the selective subset of the memory content may have a bit size of at most ⅕ or even 1/10 of the total size of all of the memory content, such that the benefits of faster secure checking without running through all of the memory content bits are sufficiently maintained. By way of example, the move engine 210 may be or be comprised of an interface circuit such as a DMA (direct memory access) controller. The move engine 210 may comprise several DMA blocks for different memory ranges, such as operating system, calibration, boot software, etc.

In some embodiments, the secure boot circuit 106 further includes an encryption module 212 coupled to the move engine 210 and configured to hash or encrypt the hashable data stream 402, to generate a digest 410 based on the hashable data stream 402 using one or more cryptographic hash algorithms, and to transmit the digest 410 to a verification module 214. By way of example, the encryption module 212 may be or be comprised of a hardware cryptographic accelerator. The encryption module 212 may be configured with various cryptographic hash algorithms such as AES (advanced encryption standard), SHA (secure hash algorithms), etc. In some embodiments, multiple different cryptographic hash algorithms may be adopted by the encryption module 212 for diversity purpose. The encryption module 212 may also be configured with side-channel protection features to prevent attacks.

In some embodiments, the secure boot circuit 106 further includes a secure move block 216 coupled to a secure memory such as the secure memory 108 and configured as the master of the secure boot circuit 106. By way of example, the secure move block 216 may be or be comprised of an interface circuit such as a DMA (direct memory access) controller. The secure move block 216 is configured to read the reference data 304 from the secure memory 108 and transmit the reference data 304 to various components of the secure boot circuit 106. The reference data 304 may include cryptographic hash keys and/or cryptographic hash configurations 404, reference digest 406, data address and configuration information 408, or other secure information that is encrypted and stored in a secure memory such as the secure memory 108. The secure move block 216 may be configured to decrypt the reference data 304 prior to transmitting various information to components of the secure boot circuit 106. In some embodiments, the secure move block 216 may be configured to decrypt and transmit the data address and configuration information 408 of the non-volatile memory circuit 104 to the move engine 210 to determine the verification data 302 read by the secure boot circuit 106. The secure move block 216 may also be configured to transmit the cryptographic hash keys and/or cryptographic hash configurations 404 to the encryption module 212 used for encrypting the hashable data stream 402. The cryptographic hash keys and/or cryptographic hash configurations 404 may be diversified for more secure encryption. The secure move block 216 may also be configured to transmit the reference digest 406 to the verification module 214. The reference digest 406 has information corresponding to the digest 410. The reference digest 406 may be hashed data of the expected error correction code. The reference digest 406 may further include hashed expected version of the erase/write count data, and/or hashed expected version of the selective subset of the memory content bits for more accurate verification, such as words, walking words within the page, or selective bits within the page from the expected memory content.

In some embodiments, the verification module 214 is configured to verify the digest 410 based on the reference data 304 and to provide the verification signal 306 indicating whether the boot sequence passes the verification. The verification signal 306 may indicate whether the boot sequence should be initiated or initiated in a normal mode. If the boot sequence does not pass the verification, an error message may be provided, and the boot sequence may be not initiated or be initiated in another mode, such as a safe mode restricted to limited set of features. In some embodiments, the verification is performed by comparing the digest 410 with the reference digest 406. If the comparison result indicates that the digest 410 matches the reference digest 406, the verification signal 306 would support initiation of the boot sequence for the electronic device. In some alternative embodiments, the verification may be performed using other approaches such as involving an analysis of a relationship between the digest 410 and the reference digest 406 to determine whether they should support initiation of the boot sequence for the electronic device. In some embodiments, the whole set of the memory content may be verified after finishing the initial verification or after initiation of the boot sequence.

Figure 5:
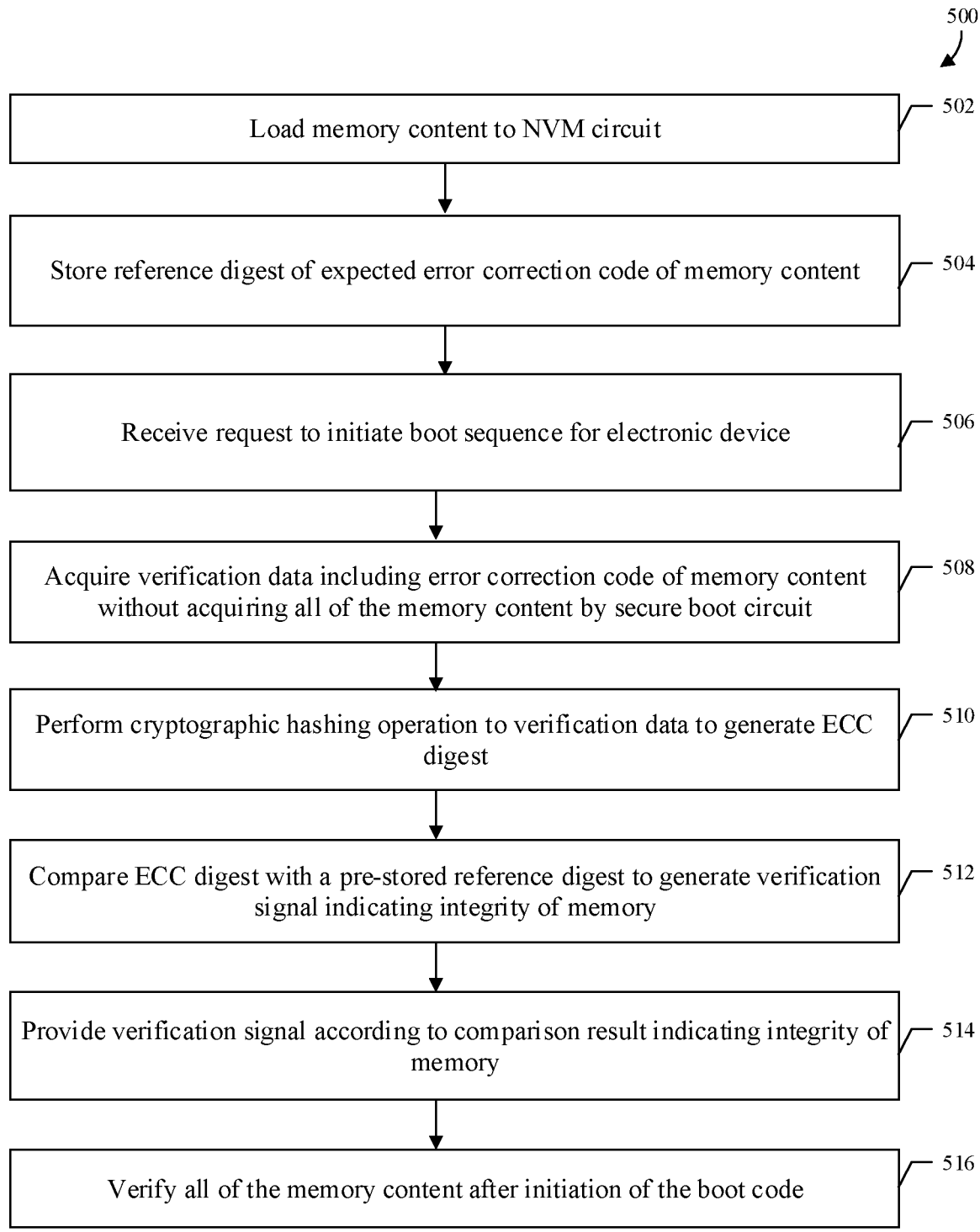
FIG. 5 illustrates a schematic flow diagram of some embodiments of a method to verify to initiate a boot sequence for an electronic device.

FIG. 5 illustrates a schematic flow diagram of a method 500 to verify to initiate a boot sequence for an electronic device according to some embodiments. Though steps of the method are shown in the flow diagram 500 as related blocks connected by arrows, it is not necessary to require all of the step blocks to perform this method. Instead, one or more steps of the method can be performed leaving out other steps shown as related blocks or in connection with other replacement steps. The steps of the method 500 also illustrate the use of the secure booting circuit and the secure booting system described above associated with FIGS. 1-4 according to some embodiments. On the other hand, the secure booting circuit and the secure booting system described above associated with FIGS. 1-4 can also be example applications of the method 500 according to some embodiments.

At step 502, in some embodiments, memory content is loaded to a non-volatile memory circuit. The loading process includes either an initial storage operation or an updating or rewriting operation thereafter through wire or wireless data transfer buses. The memory content corresponds to a boot sequence for an electronic device. In some embodiments, an expected error correction code is loaded to the non-volatile memory circuit together with the memory content. The expected error correction code is configured to check and/or correct certain numbers of the error bits of the memory content if applicable. In some alternative embodiments, the expected error correction code is generated based on the loaded memory content using an error correction algorithm directly, immediately after the storage operation, or within a threshold duration of time after loading the memory content. The expected error correction code may be generated by a memory controller of the non-volatile memory circuit. In some embodiments, the memory controller is configured to firstly read the memory content from the non-volatile memory, calculate the error correction code based on the memory content using the error correction algorithm, and store the error correction code in the non-volatile memory or another memory of the non-volatile memory circuit. The error correction code may also be calculated based on the memory content and additional address bits of the data location in the non-volatile memory.

At step 504, in some embodiments, a reference data of the expected memory content is stored to a secure memory. The reference data includes the expected error correction code or some information representing or indicating the expected error correction code. For example, the reference data may include a reference digest encoded from the expected error correction code using an error correction algorithm. The reference data may also include data address and configuration information, cryptographic hash keys, and/or and cryptographic hash configurations, the use of which are also described associated with steps 510 and 512 below.

At step 506, in some embodiments, a request is received to initiate the boot sequence for the electronic device. Over the time or affected by certain events, an expected memory content associated to the boot sequence may be degraded or attacked and thus lose integrity. Thus it is desired to check the integrity of the memory content after receiving the initiation request and before actually initiating the boot sequence for the electronic device.

At step 508, in some embodiments, verification data is acquired by a secure boot circuit from the non-volatile memory circuit. The verification data includes an error correction code as a compressed version indicating the memory content but does not include the complete memory content. The verification data may also include an erase/write count information indicating a counting number of erase and/or rewriting operations of the non-volatile memory circuit. The non-volatile memory circuit may have a write protection with a password sequence. When the write protection is removed and/or at least one write operation is performed, the counting number of erase and/or rewriting operations is incremented. The verification data may further include a selective subset of the memory content but not all of the memory content. It is understood that the more memory content bits included in the verification data 302 for verification, the more accurate the verification result may be; however, the selective subset of the memory content may have a bit size of at most ⅕ or even ¹⁄₁₀ of the total size of all of the memory content bits, such that the benefit of faster secure checking without running through all of the memory content bit is sufficiently maintained.

At step 510, in some embodiments, a cryptographic hashing operation is performed to the error correction code to generate an error correction code digest by an encryption module in the secure boot circuit. In some embodiments, the cryptographic hashing operation may also be performed to the error correction code and other components of the verification data in the secure boot circuit to generate a digest.

At step 512, in some embodiments, the reference data is fed from the secure memory to the secure boot circuit and used for generating a verification signal. The reference data may be stored in the secure memory and transmitted to the secure boot circuit as an encrypted form and is decrypted in the secure boot circuit. The data address and data stream configuration information of the non-volatile memory circuit may be fed to the secure boot circuit to indicate address and configuration of the verification data received by the secure boot circuit. The cryptographic hash keys and/or cryptographic hash configurations may be fed to the encryption module and used for encrypting the verification data. The cryptographic hash keys and/or cryptographic hash configurations may be diversified for various components of the verification data for more secure encryption. The reference digest is fed to a comparator and is compared with the digest for generating the verification signal.

At step 514, in some embodiments, the verification signal is provided according to the comparison result. The verification signal indicates integrity of the non-volatile memory circuit and whether the boot sequence passes the verification. The verification signal 306 may indicate whether the boot sequence should be initiated or initiated in a normal mode. If the boot sequence does not pass the verification, the boot sequence may be not initiated or be initiated in another mode, such as a safe mode. An error message may be provided if the boot sequence fails the verification. For example, the boot sequence is initiated in a normal mode if the verification signal is in a first state, and the boot sequence is not initiated in a normal mode, and may be initiated in a safe mode if the verification signal is in a second state. The safe mode may be restricted to limited set of features.

At step 516, in some embodiments, the whole set of the memory content is verified after finishing the initial verification or the initiation of the boot sequence.

While the methods are illustrated and described above as a series of acts or events, it will be appreciated that the illustrated ordering of such acts or events are not to be interpreted in a limiting sense. For example, some acts may occur in different orders and/or concurrently with other acts or events apart from those illustrated and/or described herein. In addition, not all illustrated acts may be required to implement one or more aspects or embodiments of the disclosure herein. Also, one or more of the acts depicted herein may be carried out in one or more separate acts and/or phases.

Accordingly, various embodiments of fast secure booting method and apparatus are disclosed herein. Aside from being used to check and fix memory content of a non-volatile memory from being damaged or degrading over time, an error correction code, as a compressed representation of the underlying memory content, is also used to verify integrity of memory data without checking through all of the memory content. Applying a cryptographic hash to the error correction code will result in a message digest or message authentication code whose contents represents the entire program. Because of the initial compression by looking at the error correction code and only checking a representative subset of the entire memory map, the amount of data to be checked is reduced. Such an approach affords the opportunity to speed the amount of memory that can be checked and monitored in far less time than looking at the uncompressed version which resides in the full memory footprint.

In some embodiments, the present disclosure is related to a method to perform a verification to initiate a boot sequence for an electronic device. The method comprises receiving a request to initiate the boot sequence for the electronic device using memory content stored in a non-volatile memory circuit and acquiring verification data from the non-volatile memory circuit indicating the memory content by a secure boot circuit. The verification data includes an error correction code for the memory content without including all of the memory content. The method further comprises performing a cryptographic hashing operation to the error correction code in the secure boot circuit to obtain a digest of the error correction code and comparing the digest with a pre-stored reference digest to generate a verification signal. The method further comprises providing the verification signal to the electronic device. The verification signal indicates whether the boot sequence passes the verification.

In some further embodiments, the present disclosure is related to a secure booting circuit for verification of initiation of a boot sequence for an electronic device. The secure booting circuit includes a move engine configured to read verification data from a non-volatile memory circuit storing memory content and an error correction code corresponding to the memory content. The verification data includes the error correction code and not including all of the memory content. The secure booting circuit further includes a secure move block configured to read a reference data from a secure memory and an encryption module coupled to the move engine and configured to receive the verification data from the move engine and encrypt the verification data to generate a digest. The secure booting circuit further includes a verification module coupled to the encryption module and the secure move block and configured to verify the digest based on the reference data and to provide a verification signal indicating whether the boot sequence passes the verification.

In some further embodiments, the present disclosure is related to a secure booting system for verification of initiation of a boot sequence for an electronic device. The secure booting system includes a non-volatile memory circuit including a non-volatile memory and a memory controller and a secure boot circuit coupled to the non-volatile memory circuit via a first transfer bus. The non-volatile memory is configured to store a memory content associated with the boot sequence and wherein the memory controller is configured to calculate an error correction code based on the memory content stored in the non-volatile memory. The secure booting system further includes a secure memory coupled to the secure boot circuit via a second transfer bus. The secure memory is configured to store an expected value corresponding to an expected error correction code. The secure boot circuit is configured to provide a verification signal without hashing all of the memory content stored in the non-volatile memory based on the expected value and the error correction code. The boot sequence is initiated in a normal mode if the verification signal is in a first state and the boot sequence is not initiated in the normal mode if the verification signal is in a second state.

As used herein, the words "by way of example" and the wording "for example" mean that an example is given or an embodiment is depicted. As aspect cited by way of example does not necessarily have to be interpreted as advantageous or preferable. Rather, the example is used to explain a concept or a technique on the basis of a specific possible embodiment. The term "technique" in this case covers any product of planned action using forces of nature, in particular "equipment" "apparatus", "device", "system", "manufactured product", "computer-readable medium", "computer program product" and "method", depending on the context.

While the invention has been illustrated, and described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

The invention claimed is:

1. A method to verify memory content stored in a non-volatile memory circuit associated with a boot sequence prior to initiating the boot sequence for an electronic device, comprising:
   receiving a request to initiate the boot sequence for the electronic device;
   acquiring a reference digest comprising an encrypted form of an expected error correction code from a secure memory;
   acquiring verification data, by a secure boot circuit from the non-volatile memory circuit, wherein the acquired verification data, based on verification data configuration, is determined to include an error correction code based on the memory content, an erase/write count information indicating a counting number of erasing and rewriting operations of the non-volatile memory circuit, and a selective subset of the memory content but not all of the memory content;
   performing a cryptographic hashing operation to the error correction code in the secure boot circuit to obtain a digest of the error correction code;
   comparing the digest with the reference digest to generate a verification signal; and
   providing the verification signal to the electronic device, wherein the verification signal indicates whether the verification passes and whether the boot sequence should be initiated.

2. The method of claim 1, prior to receiving the request to initiate the boot sequence, further comprising:
   loading an expected memory content to the non-volatile memory circuit and generating the expected error correction code based on the expected memory content; and
   storing a reference data associated with the expected memory content in the secure memory, the reference data including the reference digest.

3. The method of claim 2, wherein the reference data further includes data address and configuration information, cryptographic hash keys and cryptographic hash configurations for the error correction code, and wherein the acquisition of the error correction code and the performance of the cryptographic hashing operation are based on the data address and configuration information, the cryptographic hash keys and the cryptographic hash configurations received from the secure memory.

4. The method of claim 3, wherein the reference data is stored in the secure memory and transmitted to the secure boot circuit as an encrypted form and is decrypted in the secure boot circuit.

5. The method of claim 1, wherein the erase/write count information is compared to an expected erase/write count information previously stored and then retrieved from the secure memory for verification and generating the verification signal.

6. The method of claim 5, wherein the selective subset of the memory content is compared to information previously stored and then retrieved from the secure memory for verification and generating the verification signal.

7. The method of claim 6, wherein the cryptographic hashing operation is performed to the verification data using multiple different cryptographic hash algorithms.

8. The method of claim 1, wherein the reference digest is encrypted and stored in a secure memory and is decrypted before comparing with the digest.

9. The method of claim 1, wherein the cryptographic hashing operation encrypts the error correction code using a cryptographic hash key encrypted and pre-stored in a secure memory and decrypted before used for the cryptographic hashing operation.

10. The method of claim 1, wherein the verification data is transmitted from the non-volatile memory circuit to the secure boot circuit according to data address and the verification data configuration, wherein the verification data configuration is encrypted and pre-stored in the secure memory and decrypted before used for determining the verification data.

11. A secure booting circuit for verification of initiation of a boot sequence for an electronic device, comprising:
a move engine configured to read verification data from a non-volatile memory circuit storing memory content and an error correction code corresponding to the memory content, the verification data is determined based on verification data configuration and including the error correction code and not including all of the memory content;
an interface component with an input connected to a secure memory and configured to read a reference data from the secure memory, the reference data including encrypted expected error correction code, an expected erase/write count, and an expected selective subset of the memory content;
an encryption module coupled to the move engine and configured to receive the verification data from the move engine and encrypt the verification data to generate a digest; and
a verification circuit coupled to the encryption module and the interface component and configured to verify the digest based on the reference data and to provide a verification signal indicating whether the boot sequence passes the verification.

12. The secure booting circuit of claim 11, wherein the verification data also includes an erase/write count of the non-volatile memory circuit.

13. The secure booting circuit of claim 11, wherein the verification data also includes a selective subset of the memory content.

14. The secure booting circuit of claim 11, wherein the interface component is implemented in a secure area and configured to decrypt the reference data after receiving the reference data as encrypted from the secure memory.

15. The secure booting circuit of claim 11, wherein the interface component is configured to transmit a cryptographic hash key as a part of the reference data to the encryption module used for the encryption of the verification data.

16. The secure booting circuit of claim 11, wherein the interface component is configured to transmit a reference digest as a part of the reference data to the verification circuit used for the verification of the digest.

17. The secure booting circuit of claim 11, wherein the interface component is configured to transmit the verification data configuration as a part of the reference data to the move engine used to read the verification data from the non-volatile memory circuit, wherein the verification data configuration is used to determine the read of the verification data, including one or more of: an error correction code based on the memory content, an erase/write count information indicating a counting number of erasing and rewriting operations of the non-volatile memory circuit, and a selective subset of the memory content but not all of the memory content.

18. A secure booting system for verification of initiation of a boot sequence for an electronic device, comprising:
a non-volatile memory circuit including a non-volatile memory and a memory controller, wherein the non-volatile memory is configured to store a memory content associated with the boot sequence and wherein the memory controller is configured to calculate an error correction code based on the memory content stored in the non-volatile memory;
a secure boot circuit coupled to the non-volatile memory circuit via a first transfer bus; and
a secure memory coupled to the secure boot circuit via a second transfer bus, wherein the secure memory is configured to store reference data including an expected error correction code, an expected erase/write count, and an expected selective subset of the memory content;
wherein the secure boot circuit is configured to provide a verification signal by comparing verification data with the reference data, without hashing all of the memory content stored in the non-volatile memory, wherein the verification data is determined based on verification data configuration and includes at least the error correction code, and wherein the boot sequence is initiated in a normal mode if the verification signal is in a first state and the boot sequence is not initiated in the normal mode if the verification signal is in a second state.

19. The secure booting system of claim 18, wherein the secure memory is configured to store and transmit the verification data configuration and the reference data to the secure boot circuit as encrypted.

20. The secure booting system of claim 19, wherein the secure boot circuit is configured to perform a cryptographic hash operation to the error correction code to generate an encrypted actual value to be compared with an expected value.

* * * * *